(12) United States Patent
Thomas

(10) Patent No.: US 10,099,801 B2
(45) Date of Patent: Oct. 16, 2018

(54) CONSOLIDATED FLIGHT DECK TASK LIST BASED ON ALERTING AND CHECKLIST ITEMS

(71) Applicant: The Boeing Company, Chicago, IL (US)

(72) Inventor: Lisa C. Thomas, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/873,104

(22) Filed: Oct. 1, 2015

(65) Prior Publication Data

US 2017/0096235 A1    Apr. 6, 2017

(51) Int. Cl.
*G01C 23/00* (2006.01)
*B64D 45/00* (2006.01)
*G07C 5/02* (2006.01)
*G07C 5/08* (2006.01)

(52) U.S. Cl.
CPC .............. *B64D 45/00* (2013.01); *G07C 5/02* (2013.01); *G07C 5/0816* (2013.01); *G07C 5/0825* (2013.01); *G07C 5/0833* (2013.01)

(58) Field of Classification Search
CPC combination set(s) only.
See application file for complete search history.

(56) References Cited

U.S. PATENT DOCUMENTS

| | | | |
|---|---|---|---|
| 5,454,074 A | 9/1995 | Hartel et al. | |
| 5,522,026 A * | 5/1996 | Records | G05B 23/027 340/945 |
| 6,262,720 B1 | 7/2001 | Jeffrey et al. | |
| 6,753,891 B1 | 6/2004 | Chohan et al. | |
| 7,392,486 B1 | 6/2008 | Gyde et al. | |
| 2007/0150119 A1 | 6/2007 | Mitchell et al. | |
| 2012/0084108 A1 * | 4/2012 | Bohannon | G06Q 10/06 705/7.12 |
| 2012/0209468 A1 | 8/2012 | Thomas | |
| 2013/0214941 A1 | 8/2013 | Rogers et al. | |
| 2015/0097706 A1 * | 4/2015 | Perger | G01C 23/00 340/977 |
| 2015/0120090 A1 * | 4/2015 | Wischmeyer | B64D 45/00 701/3 |

OTHER PUBLICATIONS

Bahrami, Ali; "Flightcrew Alerting"; Advisory Circular AC No. 25.1322-1; U.S. Dept. of Transportation; Dec. 13, 2010; 42 pages.
European Patent Application No. 16192001.2; Extended Search Report; dated Dec. 9, 2016; 9 pages.
European Examination Report dated Mar. 15, 2018 for European Patent Application No. 16192001.2.

* cited by examiner

*Primary Examiner* — Brian Zimmerman
*Assistant Examiner* — Cal Eustaquio
(74) *Attorney, Agent, or Firm* — Gates & Cooper LLP

(57) ABSTRACT

An improved aircraft management system for consolidating and prioritizing alerts through the use of an alert consolidator is described herein. According to an embodiment, a method for providing a list of tasks for responding to alerts provided by an aircraft sensing system includes receiving a plurality of alerts provided by an aircraft sensing system prioritizing at least two alerts, generating a prioritized sequential list of tasks for responding to the prioritized alerts, and providing, in a single format, the prioritized sequential list of tasks.

13 Claims, 6 Drawing Sheets

CONSOLIDATED FLIGHT DECK TASK LIST BASED ON ALERTING AND CHECKLIST ITEMS

BACKGROUND

Aircraft management systems have historically been configured to provide pilots with alerts through visual, aural, and haptic formats. However, pilots may receive these alerts either simultaneously or in multiple formats. This can create a confusing and disorganized cockpit environment. For example, a pilot may overlook an alert or focus on a lower priority alert received simultaneously with a higher priority alert. Thus, there exists an opportunity to improve an aircraft management system to provide a more efficient way of receiving and processing alerts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One way to lessen confusion for pilots during an emergency situation, for instance, is to provide a consolidated and prioritized list of tasks or instructions to respond to alerts associated with the airplane system. Pilots are trained to perform tasks to respond to specific alerts that appear in a cockpit environment. These alerts are generally related to problems in the airplane's systems and equipment. In some instances, pilots search for and read an airplane manual (usually thousands of pages long) before finding a solution to an alert. Thus, pilots can be left with pressure to correctly prioritize multiple alerts themselves and perform actions under complex yet time-critical scenarios.

An aircraft management system configured to receive a plurality of alerts, prioritize each alert based on one or more of external environmental data, operating data, operating procedures, and an electronic checklist, and then generate a list of tasks responding to the plurality of alerts is disclosed herein. By utilizing an alert consolidator in conjunction with currently implemented aircraft management systems, the processing time to receive, consolidate, and prioritize alerts may be decreased. If and when using the electronic checklist to prioritize the tasks associated with alerts, the alert consolidator may also be configured to determine when consecutive steps in a checklist do not need to directly follow the previous step and can be interrupted by a separate checklist's item (if that item is deemed to be higher priority than the next item in the first checklist). Furthermore, providing pilots with a prioritized list of tasks to respond to each individual alert may also eliminate confusion during an emergency situation and allow a pilot to perform each task with greater ease.

In illustrative embodiments of the present invention, a system and method are provided for generating a prioritized sequential list of tasks responding to alerts received by the airplane system. According to one particular embodiment, a method for providing a list of tasks for responding to alerts provided by an aircraft sensing system includes receiving a plurality of alerts provided by an aircraft sensing system prioritizing at least two alerts, generating a prioritized sequential list of tasks for responding to the prioritized alerts, and providing, in a single format, the prioritized sequential list of tasks. According to another particular embodiment, an engine-indicating and crew-alerting system includes one or more memories having stored thereon computer-readable instructions that, upon execution by a computing device, cause the system to: receive at least one or more alerts provided by an aircraft sensing system, prioritize at least two alerts, generate a prioritized sequential list of tasks for responding to the prioritized alerts, and provide, in a single format, the prioritized sequential list of tasks.

BRIEF DESCRIPTION OF DRAWINGS

The foregoing Summary and the following Detailed Description are better understood when read in conjunction with the appended drawings. In order to illustrate the present disclosure, various aspects of the disclosure are shown. However, the disclosure is not limited to the specific aspects discussed. The following figures are included.

DETAILED DESCRIPTION OF ILLUSTRATIVE EMBODIMENTS

Figure 1:
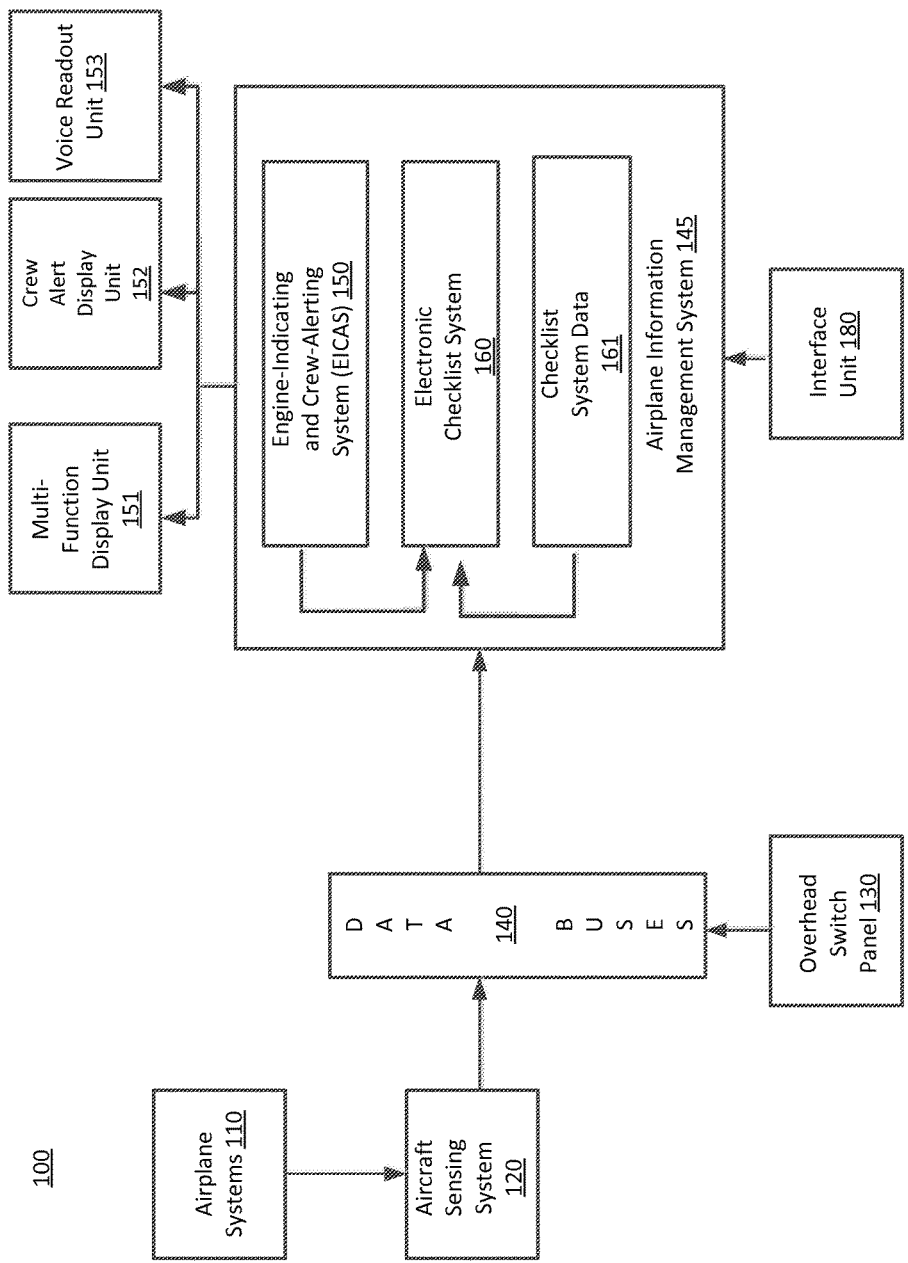
FIG. 1 is a block diagram depicting an engine-indicating and crew-alerting system (EICAS) operatively interconnected with display units, a voice readout unit, and various other airplane systems and equipment.

In airplanes where engine-indicating and crew-alerting systems (EICAS) are used, there exists an increased demand for improvements and more efficient ways to provide alerts and the tasks associated with responding to the alerts to pilots or flight crew. The conventional techniques, such as multi-modal alerting, which is intended to prevent any one sensory channel (e.g., visual, auditory, or haptic) from becoming overloaded, generally puts pilots in strenuous and difficult situations. Pilots may not be able to process visual, aural, and haptic inputs that happen simultaneously. Furthermore, pilots may be prone to 'tunnel' into one alert and miss or ignore other alerts that may be equally or more important. It may also be difficult for pilots to discern the priority of alerts, or more specifically what actions are needed to be taken to resolve a specific situation in the event of multiple or complex system failures. When the information is provided in a variety of modalities, especially when some information is provided in more than one modality, confusion amongst pilots can occur. Each individual alert has been carefully designed to achieve its purpose of informing the pilot of a condition or prompting for an action to be taken; however, when multiple alerts occur in a short period of time, across a range or modalities, the resultant effect can be overwhelming, particularly to less experienced pilots.

As mentioned above, in many airplane systems, pilots are informed of alerts by way of at least three different formats or channels. One format involves the visual display of alerts.

In other words, alerts are displayed in a cockpit environment as text, symbols, or icons on a display unit or via illuminated indicators. At least one or more display units and illuminated indicators may present multiple alerts simultaneously. However, when multiple alerts are presented, pilots may be susceptible to distraction and disorganization when performing tasks responding to the alerts.

A second format to inform pilots about alerts involves communicating the alerts through an auditory format. Again, when multiple alerts simultaneously arise in a cockpit environment, the use of verbal or non-verbal aural alerts can create and cause confusion. Pilots are still required to spend significant time to process which task or alert to attend to first.

A third format involves informing pilots by way of haptic actions. Haptic actions may include joy-stick shaking, vibrations in the seat, or any sort of action that is related to pilots touching the system. In addition, when multiple haptic alerts are presented simultaneously to pilots, it may be difficult for pilots to figure out which haptic alert needs to be attended to first. Thus, this format also has a tendency to may leave pilots confused in a cockpit environment.

As technology in both airplane systems in general, and in EICAS in particular, becomes more advanced, it becomes more important to expedite the process of consolidating alerts in a manageable yet efficient manner. Being able to consolidate the alerts and prioritize the alerts before informing the pilots would, in turn, decrease the overall time it takes for pilots to complete a task (especially during an emergency situation). Therefore, a system that receives, consolidates, and prioritizes alerts in an airplane system in a timely and efficient manner is preferred. Furthermore, a system that generates and presents a list of tasks responding to the alerts to pilots in a single, easy to understand manner is also preferred. This system would reduce the possibility of human error and, at the same time, decrease the amount of time it takes for pilots to respond to an alert during emergency situations.

Disclosed herein is a method and system with an improved mechanism for providing pilots with tasks associated with responding to alerts generated by an airplane system. Various systems, methods, and computer program products may be employed in conjunction with the practice of various aspects of the present disclosure. Aspects of the present disclosure may be employed in an improved mechanism for EICAS. This may comprise receiving a plurality of alerts (e.g., engine failure warning, landing gear failure warning) from an aircraft sensing system. The plurality of alerts would be prioritized based on at least one of: external environmental data, operating data, pre-determined set of operating procedures, and an electronic checklist. By using an electronic checklist, for example, prioritization of tasks associated with alerts may be achieved. An alert consolidator may also be configured to determine when consecutive steps in an electronic checklist do not need to directly follow the previous step and can be interrupted by a separate checklist's item. Once prioritized, a list of tasks responding to the alerts may be generated and further presented to pilots. Industries, companies, and individuals may all leverage such an approach to improve the efficiency and organization of receiving alerts and prioritizing them.

Referring now to FIG. 1, an airplane management system 100 suitable for employing an EICAS 150 is illustrated. The Airplane Information Management System (AIMS) 145 includes one or more signal processing units and related system memory (both random access memory and read only memory) that are structurally and functionally interconnected in a conventional manner, but not shown for ease of illustration. Programs for processing data stored in system memory are also not shown. Data used during operation of AIMS 145 also are stored in system memory.

Data buses 140 allow the AIMS 145 to access signals representative of the status (e.g., opened, closed, on, off) of various airplane switches and valves, such as the switches located on a flight deck overhead switch panel 130. As is known to those skilled in the art, the airplane data buses 140 receive various signals from numerous airplane systems 110 via the aircraft sensing system 120. Selected ones of these airplane system signals are monitored and processed by the EICAS 150 in order to determine non-normal system conditions and report those conditions to the pilots or flight crew by means of at least one of: visual, aural, and haptic alerts.

The EICAS 150 is interfaced with the data buses 140 to receive signals representative of the status of each alert provided by the EICAS 150 (e.g., whether a particular alert is or is not in effect). In addition, the electronic checklist system (ECL) 160 is interfaced with the EICAS 150 so that the ECL system 160 can supply information to the EICAS 150 indicative of checklist status, e.g., whether a checklist associated with a crew alert has been completed; has been selected for execution, but has not been completed; has not yet been selected for execution; has been overridden; or is presently inhibited (no action required).

The ECL system 160 receives data signals from the checklist system data 161. These data signals provide the ECL system 160 with information that includes system configuration information, a checklist index file that allows rapid retrieval and display of checklists, checklist text that provides the information items displayed by the ECL system 160, and checklist attribute information, such as an inhibit attribute. As shall be described in more detail below, the checklist attributes employed by the invention enable the ECL system 160 to achieve various system objectives. As previously noted, these objectives include efficient execution of non-normal checklists, and the ability to easily modify the ECL system 160 to suit the needs of a particular airline or other airplane user. More importantly, the ECL system 160 provides the EICAS 150 with information on prioritizing the list of tasks associated with responding to the incoming alerts from the data buses 140.

Moreover, FIG. 1 indicates the means and various ways to present pilots or flight crew with a list of tasks associated with responding to alerts. The aircraft management system 100 may include at least one of: one display unit identified as a crew alert system display unit 152, at least three multi-function display (MFD) units 151, and a voice readout unit 153. In this arrangement, the crew alert system display unit 152 and the MFD units 151 are configured and arranged in a manner that is similar to the color monitors that are used in conventional computer and work station systems. The crew alert system display unit 152 displays crew alert messages perceived by the EICAS 150. The MFD unit 151 displays normal and non-normal checklists, checklist selection menus, other checklist information, and command buttons. Additionally, the voice readout unit 153 provides crew alert messages and tasks associated with responding to the alerts through an auditory format (e.g., verbal statements).

An interface unit 180 allows the pilots to interact with checklists and alerts on the MFD unit 151, the crew alerts display unit 152, or voice readout unit 153. The interface unit 180 may include a pointing device such as a ball, joystick, up/down-left/right control keys, or touch pad with activation button (not shown in FIG. 1). The pointing device serves as a cursor control for a cursor or other indicia. The cursor may be moved over the face of the MFD unit 151. The cursor may also be configured to control the volume of the voice readout unit 153. A displayed item is selected by depressing a switch or similar device that is included with the interface unit 180, when the cursor is within the vicinity of the displayed item.

The system described above provides rapid and accurate information to the pilots responding to alerts generated by the airplane systems 110, aircraft sensing system 120, and the overhead switch panel 130. The currently preferred embodiment of the invention includes an alert consolidator (not pictured in FIG. 1-2, but pictured in FIGS. 3-6) in connection with the EICAS 150. The description of the alert consolidator will be discussed in more detail in the description of FIGS. 3-6 below.

Figure 2:
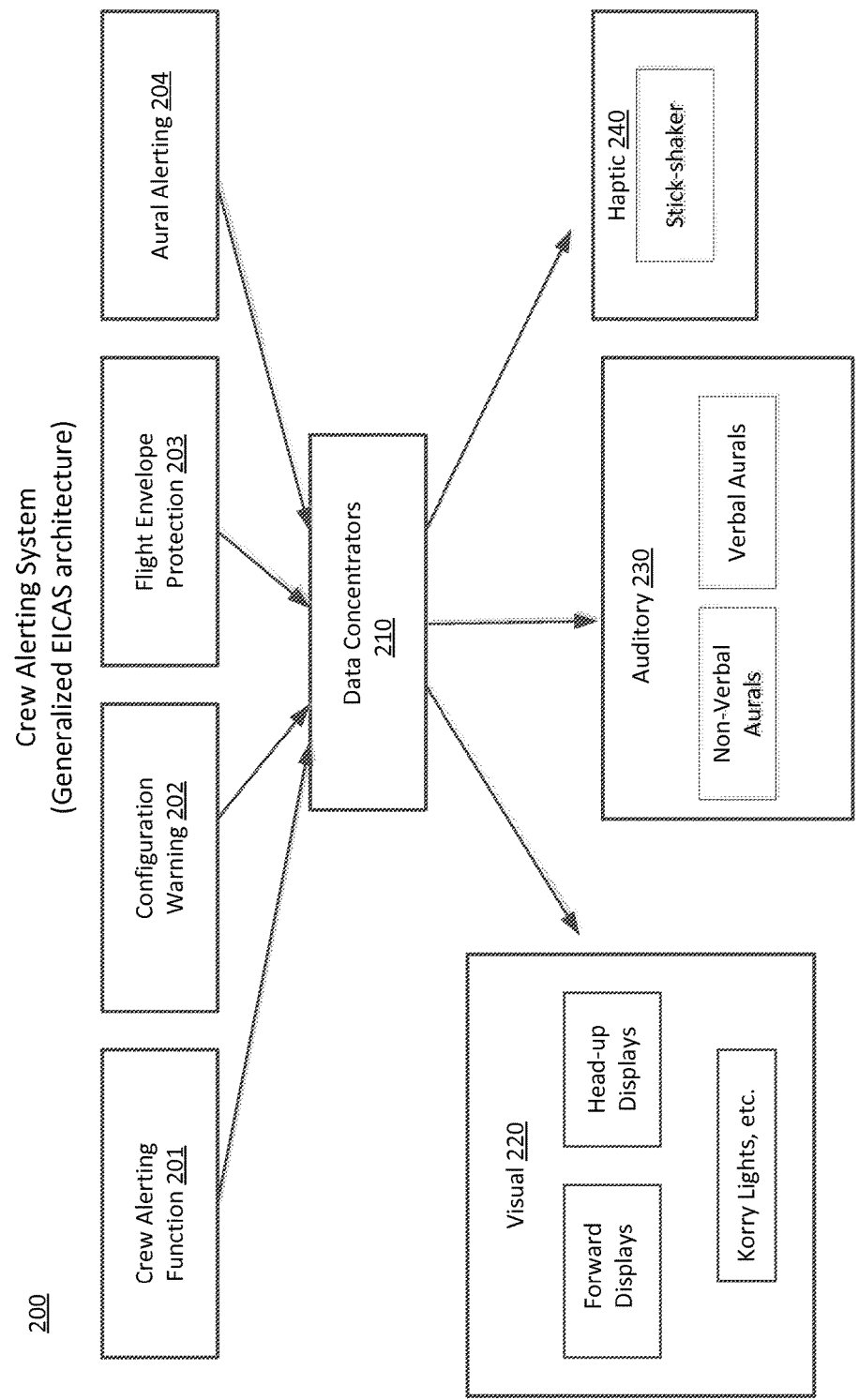
FIG. 2 is a block diagram depicting an example of an EICAS executing alerts without an alert consolidator in an airplane management system.

FIG. 2 depicts an example of a generalized EICAS 200 without an alert consolidator. This generalized EICAS 200 is currently developed and implemented in many of the aircraft systems today.

As shown in FIG. 2, many aircraft systems receive alert signals from at least one of: crew alerting function 201, configuration warning 202, flight envelope protection 203, and aural alerting 204. These alerts are received into a data concentrator 210 that is configured to provide pilots or flight crew with the alerts 201-204 in a variety of formats. In one embodiment, an alert is presented to pilots through a visual format 220 ((e.g., on a display screen such as one or more forward displays, one or more heads-up displays, illuminated indicators (Korry lights), etc.)). Another example of providing pilots with alert information is through an auditory format 230 (e.g., voice readout, non-verbal aural indications, verbal aural indications, or some combination thereof). And yet another example of providing pilots with an alert is accomplished through a haptic format 240 (e.g., joystick shaking). However, presenting alerts through multiple formats may create and cause confusion for pilots in a cockpit environment. This becomes even more complicated when multiple alerts appear simultaneously.

Figure 3:
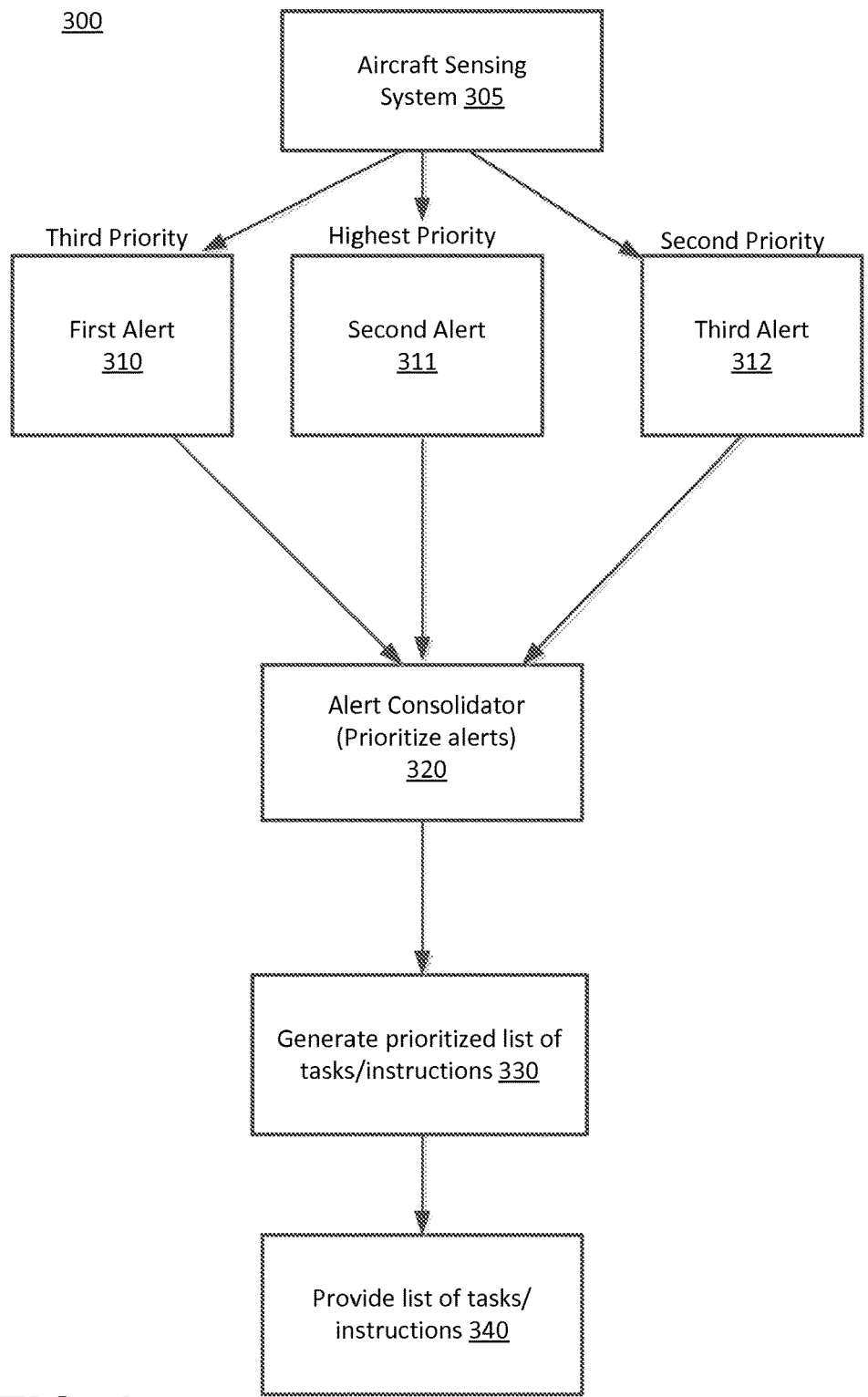
FIG. 3 illustrates a flowchart representing the operation of an EICAS with an alert consolidator in an airplane management system.

FIG. 3 illustrates a presently preferred embodiment with an improved EICAS 150 by incorporating an alert consolidator 320 to receive alerts, prioritize alerts, and generate a list of tasks responding to the alerts. In the preferred embodiment, an aircraft sensing system 305 receives alerts 310-312 generated from various airplane systems and equipment. Each alert 310-312 may, for instance, contain information related to a system or equipment failure. The alerts 310-312 are received at an airplane sensing system 305. The aircraft sensing system 305, via data buses 140, may then transfer or send the alerts 310-312 to a data concentrator (not pictured, but pictured in FIGS. 4-5) first prior to arriving at an alert consolidator 320. Or the alerts 310-312 may be directly transferred to the alert consolidator 320. The alert consolidator 320 may then re-organize and prioritize the received alerts 310-312 based on at least one of: external environmental data, operating data, pre-determined operating procedures, and an electronic checklist. As is known to those skilled in the art, various and other information may also be utilized to determine the priority of the received alerts 310-312. A prioritized list of tasks may be generated 330 in such a manner where tasks responding to alert 311 (with the highest priority) may be at the top of the generated task list 330 and tasks responding to alert 310 (with the lowest priority) may be at the bottom of the generated task list 330. In other words, the generated task list 330 may be a list comprising a ranked order of tasks or actions that require pilots to complete. The generated task list 330 may be dynamically updated by adding, removing, and reprioritizing the list of tasks as situations evolve. As a non-limiting example, if several tasks are resolved by an earlier task, those tasks may be removed from the generated task list 330. Furthermore, in another non-limiting example, if several airplane systems are affected by a single event at different times and require additional tasks, the tasks are added to the generated task list 330. Yet, in another non-limiting example, if any tasks are contra-indicated by the event or other exigent circumstances, those tasks can be automatically or dynamically removed from the generated task list 330.

Therefore, once the task list is generated, the EICAS 150 may provide the list of tasks 340, associated with responding to the received alerts 310-312, to pilots or flight crew in a single and easy to understand format. The list of tasks 340 may include actions or verbal statements such as: "Pull Up," "Reduce Airspeed," or "Flaps Disagree." The list of tasks 340 may be read via a voice reader unit 153 to recite the tasks, instructions, or verbal statements related to performing actions that respond to the alerts 310-312 received in a cockpit environment. Once a task or action is completed, the EICAS 150 may provide the next task from the generated list to the pilots. This may occur until all tasks are completed.

Figure 4:
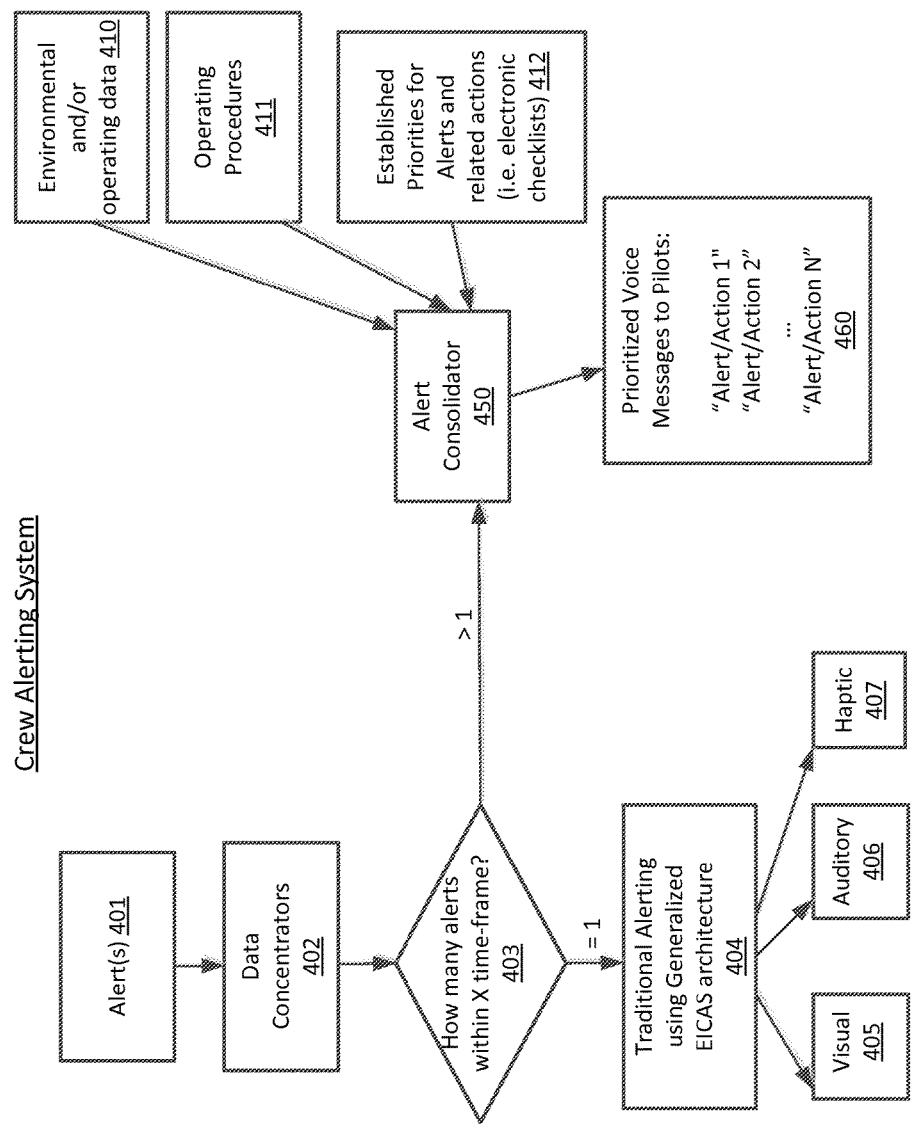
FIG. 4 illustrates a flow diagram representing the operation of an EICAS in conjunction with an alert consolidator for an improved EICAS.

FIG. 4 illustrates an improved EICAS 150 in an aircraft management system 100 that includes the generalized EICAS 200 operating in conjunction with an alert consolidator 450 to produce a more efficient and improved aircraft management system 100. In other words, FIG. 4 depicts the preferred embodiment, in a flow diagram, of the invention ((e.g., using an alert consolidator 450 to operate in conjunction with a generalized EICAS (currently implemented in aircrafts)). Again, as one or more alerts 401 are received by the signal sensing system 305, the alerts 401 may be transferred to a data concentrator 402 via data buses 140. In some instances, the alerts 401 may directly be sent to the alert consolidator 450 without passing through the data concentrator 402. At the data concentrator 402, a determination 403 is made as to the amount of alerts received during a timeframe X. In other words, an aircraft management system 100 may receive alerts 401 at the aircraft sensing system 305 for thirty seconds. During the thirty seconds, all the alerts 401 and information associated with the alerts are sent to the data concentrator 402. There may be N amount of alerts at the data concentrator 402 during the thirty seconds. In another embodiment, the data concentrator 402 may continue to receive alerts beyond the thirty seconds as more new alerts may occur when the airplane systems are in use. Therefore, the data concentrator 402 may be configured to be dynamically updated.

At the determination 403 of the amount of alerts, if the amount of the alerts amounts to a single alert 401, then the single alert 401 and the task responding to the single alert 401 would directly be provided to the pilots by way of at least one of the following formats: visual 405, auditory 406, and haptic 407. If there is only one alert 401, during timeframe X, then only one task is needed to be completed for alert 401. There may not be a need to consolidate and prioritize a single alert 401.

Moreover, at the determination 403 of the amount of alerts, if the alerts 401 amount to more than a single alert (e.g., at least two or more alerts) then the alerts 401 may be sent, transferred, or directed to an alert consolidator 450. At the alert consolidator 450, the alerts 401 are prioritized based on at least one of: external environmental data (not pictured), operating data 410, pre-determined operating procedures 411, and electronic checklists 412 (provided by the electronic checklist system 160). As described the above, if and when using an electronic checklist 412 to prioritize the tasks associated with alerts 401, the alert consolidator 450 may also be configured to determine when consecutive steps in an electronic checklist do not need to directly follow the previous step and can be interrupted by a separate electronic checklist's item (if that item is deemed to be higher priority than the next item in the first electronic checklist). The external environmental data, operating data 410, pre-determined operating procedures 411, or electronic checklist 412 may be manipulated, configured, or created through user input or from cached information related to ranking and prioritizing alerts. In other words, the external environmental data, operating data 410, pre-determined operating procedures 411, or electronic checklist 412 contain certain criteria that may be applied to establish priority amongst the plurality of alerts 401. Once the alert consolidator 450 generates the prioritized list of tasks responding to the received alerts 401, the alert consolidator 450 may transmit and provide the list of tasks to pilots. The list of tasks may be prioritized in such a way that the highest priority alert is at the top of the list and the lowest priority alert is at the bottom of the list.

There are multiple formats (e.g., visual, auditory, or haptic) that the alert consolidator 450 may present the list of tasks to pilots or flight crew. However, in the current and preferred embodiment of the invention, voice messages 460 via a voice reader unit 153 are utilized to read the tasks to the pilots. The voice messages 460 may be read with a first indicator. The first indicator informs the pilots that the first task is about to presented. Furthermore, the voice message 460 may also provide a second indicator. The second indicator may inform the pilots that the first task has been completed. The second indicator may be presented to the pilots prior to providing the second task in the list to the pilots. For example, a voice message 460 may state "Begin" or "Begin first task," as the indicator to inform a pilot that a first task is about to be presented. In another example, the voice message 460 may state "Alert/Action 1" as the first indication of a first task. The voice message 460 may state "End" or "End of Alert/Action 1," as the indicator that the first task has been completed. This "End" or "End of Alert/Action 1," indicator informs the pilots that the task has been completed and that a subsequent task may be presented next. The languages for indicators are provided as non-limiting examples. As is known to those skilled in the art, other possible language may also be implemented to represent indicators prior to beginning and after completion of a task.

Regarding the presentation of the voice messages 460 to pilots, there are various implementations that voice messages 460 may be presented to the pilots. In one non-limiting example, the voice message 460 may wait a certain or predetermined amount of time before providing a subsequent task after a first task has been presented. The amount of time may be predetermined by a user or pre-set by the EICAS 150. To further illustrate the example, a first task may be provided to the pilots by voice message 460 and one minute may pass before a second task is presented to the pilots. This is a time-based example. In another non-limiting example, the voice message 460 may be provided based on the completion of a task. For instance, after a first voice message 460 is presented to pilots, EICAS 150 waits until it is completed. Once EICAS 150 receives the notification that the first task has been completed by the pilots, a second voice message detailing a second task may be presented and provided to the pilots. This may continue to occur until all the tasks have been completed. This is a performance-based example. As is known to those skilled in the art, other possible implementations to present voice messages to the pilots may be performed. After all the voice messages 460 have been conveyed to the pilots and all the tasks in the list are complete, the EICAS 150 waits for more alerts. When a new set of alerts come in, the EICAS 150 may then proceed and again undergo the entire process of receiving the alerts, prioritizing the alerts, and generating a list of tasks responding to the alerts.

Figure 5:
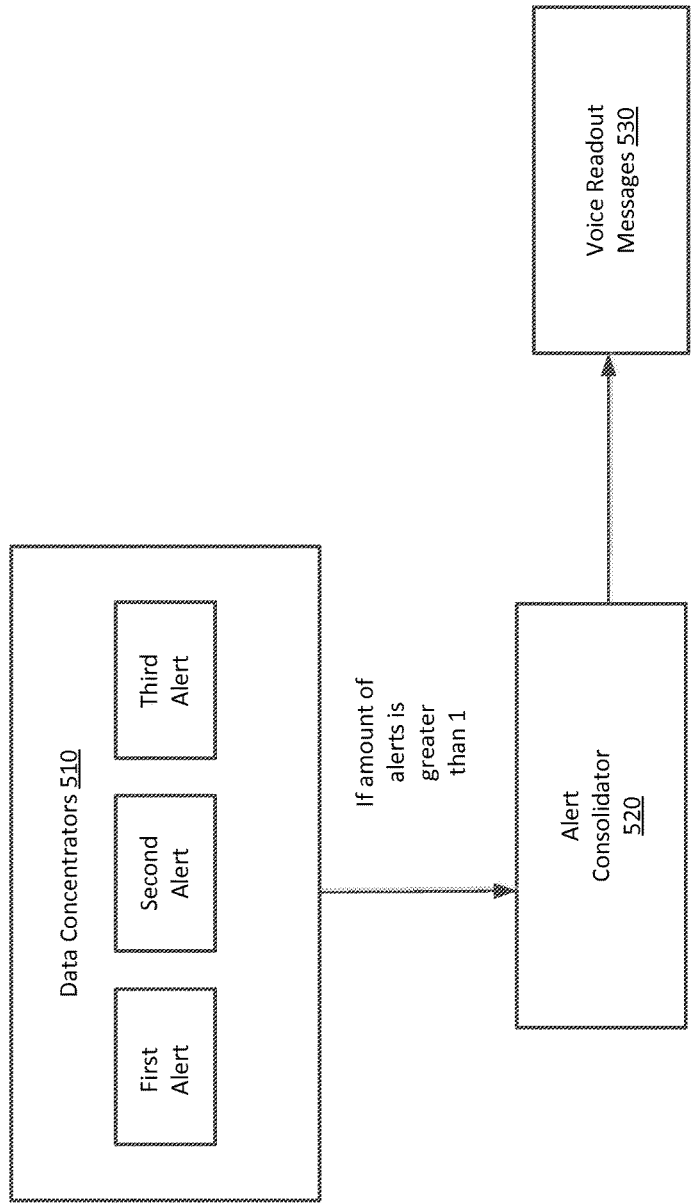
FIG. 5 is a flow diagram representing receiving alerts, prioritizing the alerts, and providing voice readouts of the tasks or instructions responding to the alerts.

FIG. 5 illustrates an example embodiment of receiving alerts, prioritizing the alerts, and generating a prioritized list of tasks needed to respond to the alerts. FIG. 5 shows alerts arriving at a data concentrator 510. Once received, the data concentrator 510 determines if the amount of alerts are greater than 1. If the amount of alerts is greater than 1, the data concentrator 510 subsequently sends the alerts to an alert consolidator 520. The alert consolidator evaluates the alerts based on at least one of: external environmental data, operational data, pre-determined set of operating procedure, and an electronic checklist in order to prioritize them. Again, as described above, if and when using the electronic checklist to prioritize the tasks associated with alerts, the alert consolidator 520 may also be configured to determine when consecutive steps in a checklist do not need to directly follow the previous step and can be interrupted by a separate checklist's item (if that item is deemed to be higher priority than the next item in the first checklist). Once prioritized, the alert consolidator 520 generates a list of tasks responding to the alerts. Each task in the generated task list is ranked based on priority.

Through the voice readout unit 153, voice readout messages 530 may be presented one-by-one to the pilots or flight crew. In a non-limiting example, when an airplane is in an emergency situation, for instance, a cockpit environment can be very hectic. The pilots are trained to apply their training to conduct and perform tasks responding to any of the incoming alerts related to the aircraft's system and equipment. Thus, it would be preferred to have an alert consolidator working in conjunction with an EICAS such that the alerts are first consolidated automatically based on their prioritization level. Once it is automatically determined which of the alerts should be prioritized first, the voice readout unit 153 may then provide voice messages to the pilots to respond to each individual alert based on their priority. This way, a single task is provided to a pilot at a time. This may help eliminate the stress and the time-consuming process of pilots to perform tasks where pilots have to either use their discretion to prioritize tasks or have to reach into flight manuals to find the steps needed to take to respond to a certain alert. In essence, an improved EICAS 150 (with an alert consolidator 320) would provide a dynamic and efficient way of delivering prioritized tasks to pilots when alerts are detected from the aircraft's systems and equipment.

Figure 6:
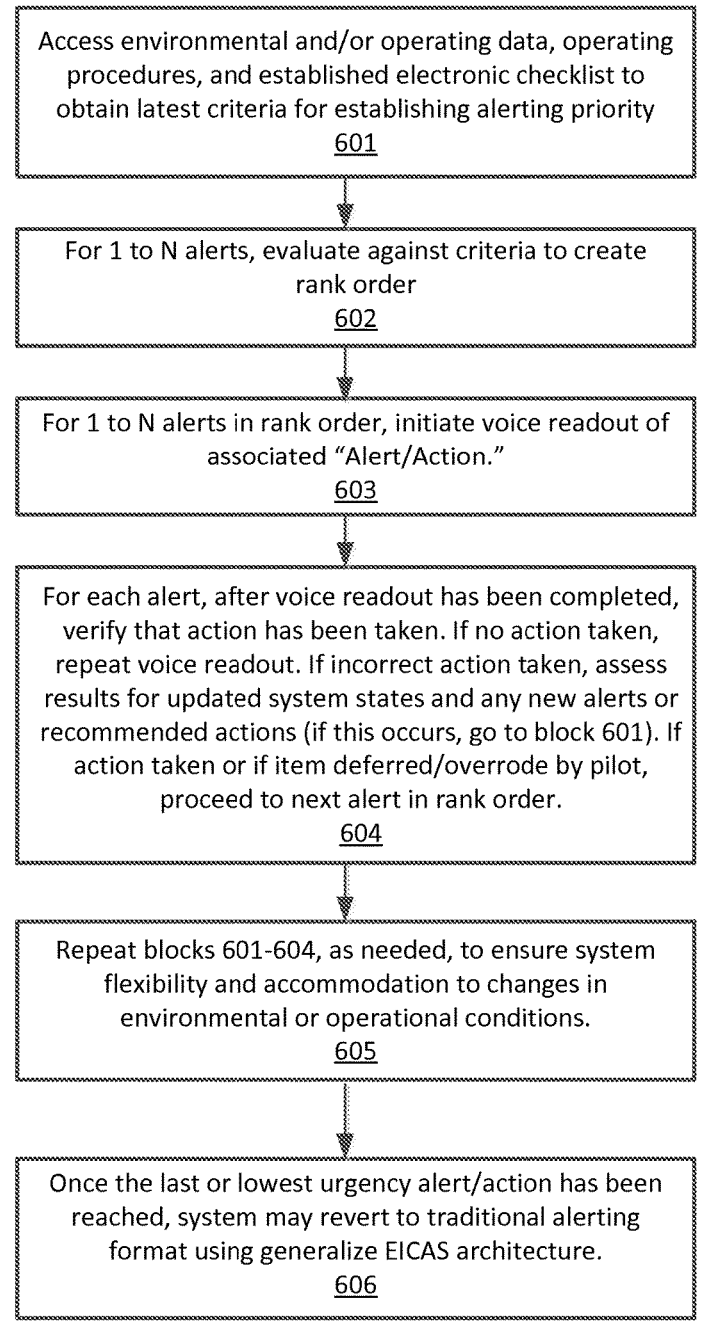
FIG. 6 illustrates a flow diagram representing alerts and the process in which alerts are prioritized in the alert consolidator.

FIG. 6 illustrates a flowchart 600 of the steps and process an alert consolidator performs when consolidating and prioritizing alerts. Referring to block 601, the alert consolidator may initially access at least one of: environmental data, operating data, operating procedures, and an established electronic checklist to obtain the latest criteria for prioritizing alerts. In other words, block 601 applies the obtained set of criteria to each of the received individual alerts and prioritizes them based on the criteria. The obtained criteria provide the necessary information to prioritize the alerts in order to generate the list of tasks to respond to the alerts in a ranked sequential order.

Referring to block 602, the alert consolidator may evaluate the received alerts based on the criteria. The criteria, as mentioned in block 601, is evaluated with N amount of alerts. After criteria have been applied to each individual alert, block 602 generates a ranked order or list of tasks that are responding to the N amount of alerts. These tasks are ranked in order of priority. A high priority alert may be at the top of the ranked list and low priority alert may be at the bottom of the ranked list.

Referring to block 603, the generated list of ranked tasks may be presented to pilots via a voice readout unit. The voice readout may include a first indicator that informs the pilots that the first task is about to begin. For example, the first indicator of the voice readout may recite, "Alert 1, perform Action 1." Furthermore, the voice readout may also include a second indicator that informs the pilot that the first task has been completed. For example, the second indicator of the voice readout may recite, "Action 1 complete." Accordingly, the alert consolidator via a voice readout unit may then provide the pilots with the next task listed in the ranked order of tasks generated. Again, as is known to those skilled in the art, other examples and variations of language may be used as indicators prior to beginning and after completion of a task. As described above, the time between the presentation of tasks may depend on several factors. In one example, a time of one minute may elapse in between task readouts. In another example, the subsequent task is not presented to pilots until the first task is complete.

Referring to block 604, after a voice message (readout) from the voice readout unit has been completed relating to an alert, the alert consolidator may verify that the action has been completed or taken. If no action has been taken, the voice readout may be repeated. If an incorrect action has been taken, the alert consolidator may be configured to assess results for updated system states and any new alerts or recommended actions (if this occurs, go to block 601). If action taken or if the action is deferred/overrode by the pilot, the alert consolidator may proceed to next task from the generated list.

Referring to block 605, the steps beginning in block 601 may be repeated to ensure that all changes are accounted for. In other words, block 601 may be repeated as needed to ensure system flexibility and accommodation to changes in environmental or operational conditions.

Referring to block 606, once all the alerts have been accounted for, the alert consolidator may wait for more alerts. Depending on the amount of alerts, the EICAS may either directly provide the task responding to the alert to the pilots or prioritize the alerts through an alert consolidator. If there is only a single alert, the alert may be directly presented to the pilots via three channels (e.g., visual, auditory, or haptic). If at least two alerts exist, then the process repeats beginning from block 601 such that the alerts may be consolidated and prioritized. The tasks associated with responding to the alerts would be presented in a list to the pilots in a succinct and easy to understand format. The preferred embodiment sends the list of tasks through an auditory format (e.g., voice readouts); however, it is understood that other formats may be used herein. The preferred embodiment would provide the list of tasks to the pilots in just a single format instead of multiple formats.

The features, functions, and advantages that have been discussed can be achieved independently in various embodiments or may be combined in yet other embodiments, further details of which can be seen with reference to the following description and drawings. The terminology used in the description of the invention herein is for the purpose of describing particular implementations only and is not intended to be limiting of the invention. As used in the description of the invention and the appended claims, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

As used in the claims, the term "computing device" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (e.g., computer-readable medium) for storing a program which is readable by the processing unit.

It will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular implementations disclosed herein.

What is claimed:

1. A method for providing a list of tasks for responding to alerts provided by an aircraft sensing system, the method comprising:
  receiving a plurality of alerts provided by an aircraft sensing system;
  prioritizing the plurality of alerts;
  generating a prioritized sequential list of tasks for responding to the prioritized plurality of alerts; and
  providing, in a single format, the prioritized sequential list of tasks, and modifying the prioritized sequential list with tasks from a separate checklist;
  wherein prioritizing the plurality of alerts comprises:
    applying a set of criteria to the alerts, wherein the set of criteria include environmental data, operating data, operating procedures, and one or more established prioritized checklists;
    comparing the alerts with the set of criteria; and
    prioritizing tasks by creating a ranked prioritized sequential list of tasks for responding to the alerts, comprising:
      comparing the alerts with the one or more established prioritized checklists;
      determining when a consecutive step in a first established prioritized checklist does not directly follow a previous step;
      if the consecutive step in the first established prioritized checklist does not directly follow the previous step, determining if an item of a second prioritized checklist has a higher priority than the consecutive step;
      if the item of the second prioritized checklist has a higher priority than the consecutive step, interrupting items in the first established prioritized checklist with the item with the higher priority checklist item from the second prioritized checklist;

creating the ranked prioritized sequential list of tasks for responding to the plurality of alerts; and providing, in a single format, the ranked prioritized sequential list of tasks;

wherein the single format includes any one of: visual, aural, and haptic formats.

2. The method of claim 1, wherein the plurality of alerts comprise at least one of:

crew alerting function, configuration warning, flight envelope protection, and aural alerting.

3. The method of claim 1, wherein generating the prioritized sequential list of tasks is configurable by a user or through user input.

4. The method of claim 1, wherein providing prioritized sequential list of tasks further comprises:

providing, by voice message, a first task for responding to a first alert;

determining that the first task has been completed; and in response to the determination that the first task has been completed, providing, by voice message, a second task for responding to a second alert.

5. The method of claim 4, wherein the first task, provided by voice message, is preceded by a first indicator indicating that a first task is about to begin, and a second indicator, different from the first indicator, that the first task has been completed.

6. The method of claim 1, wherein generating the prioritized sequential list of tasks is dynamically updated by adding, removing, and reprioritizing the prioritized sequential list of tasks as situations evolve.

7. An engine-indicating and crew-alerting system, comprising:

one or more memories having stored thereon computer-readable instructions that, upon execution by a computing device, cause the system to:

receive a plurality of alerts provided by an aircraft sensing system;

prioritize the plurality of alerts;

generate a prioritized sequential list of tasks for responding to the prioritized plurality of alerts;

provide, in a single format, the prioritized sequential list of tasks;

wherein the plurality of alerts are prioritized by:

applying a set of criteria to the alerts, the set of criteria including environmental data, operating data, operating procedures, and one or more established prioritized checklists;

comparing the alerts with the set of criteria;

wherein the prioritized sequential list of tasks for responding to the prioritized plurality of alerts is generated by:

prioritizing tasks by creating a ranked prioritized sequential list of tasks for responding to the plurality of alerts; and providing, in a single format, the ranked prioritized sequential list of tasks;

wherein the tasks are further prioritized by:

comparing the plurality of alerts with the one or more established prioritized checklists;

determining when a consecutive step in a first established prioritized checklist does not directly follow a previous step;

if the consecutive step in the first established prioritized checklist does not follow the previous step, determining if an item of a second prioritized checklist has a higher priority than the consecutive step; and if the consecutive step in the first established prioritized checklist has the higher priority than the consecutive step, interrupting items in the first established prioritized checklist with an item with the higher priority from the second prioritized checklist;

wherein the single format includes any one of: visual, aural, and haptic formats.

8. The system of claim 7, wherein the plurality of alerts comprises at least one of: crew alerting function, configuration warning, flight envelope protection, and aural alerting.

9. The system of claim 7, wherein providing the ranked prioritized sequential list of tasks further comprises:

providing, by voice message, a first task for responding to a first alert;

determining that the first task has been completed; and in response to the determination that the first task has been completed, providing, by voice message, a second task for responding to a second alert.

10. The system of claim 9, wherein the first task, provided by voice message, is preceded by a first indicator indicating that a first task is about to begin, and a second indicator, different from the first indicator, that the first task has been completed.

11. The system of claim 7, wherein generate the prioritized sequential list of tasks is dynamically updated by adding, removing, and reprioritizing the prioritized sequential list of tasks as situations evolve.

12. The method of claim 1, wherein the list of tasks is prioritized by a computing device having an alert consolidator.

13. The method of claim 1, further comprising:

determining, by a dynamically updated task consolidator, a number of the plurality of alerts received by the aircraft sensing system during a timeframe; and determining that the number of the plurality of alerts received by the aircraft sensing system is greater than one.

* * * * *